Patented Aug. 16, 1938

2,127,382

UNITED STATES PATENT OFFICE 2,127,382

CARRYING OUT CATALYTIC REACTIONS

Mathias Pier, Heidelberg, and Paul Jacob and Walter Simon, Ludwigshafen-on-the-Rhine, Germany, assignors to Standard-I. G. Company, Linden, N. J., a corporation of Delaware No Drawing. Application January 29, 1936, Serial No. 61,308. In Germany January 30, 1931

9 Claims. (Cl. 196—53)

This invention is a continuation-in-part of the invention claimed in our copending application Ser. 728,132, filed May 29th, 1934, now matured into Patent No. 2,039,259, which relates to improvements in carrying out catalytic reactions, in particular the destructive hydrogenation of hydrocarbon products and which in turn has been divided out from application Ser. No. 586,948, filed January 15th, 1932, now matured into Patent No. 2,038,599.

For carrying out catalytic reactions, in particular for the production of valuable hydrocarbons by destructive hydrogenation of most various kinds of hydrocarbon products, such as all varieties of coals, tars, mineral oils, or products obtained by conversion or distillation or extraction of any of them, which treatment, as is known, is carried out at temperatures between 300° and 700° C. and under elevated pressures, preferably above 50 atmospheres, it has already been proposed to use metal sulphides as catalysts.

In the said application Ser. No. 586,948 are claimed catalysts, and processes for carrying out catalytic reactions at elevated temperatures with combustible carbonaceous materials in the presence of catalysts, which comprise sulphides of heavy metals, other than iron, which during and after their preparation are precluded from substances having a substantial oxidizing action and which are prepared by treating heavy metals or their compounds with sulphidizing agents at temperatures between 150° and 700° C., added free hydrogen being present, if at all, in amounts not exceeding 10 per cent of the entire amount of volatile constituents, and the treatment, at least for some time being carried out under elevated pressure when the metal compound employed is one other than the sulphide, whereby all of the metal is completely combined with sulphur.

In application Ser. No. 728,132 are claimed catalysts and processes for carrying out catalytic reactions at elevated temperatures with combustible carbonaceous materials in the presence of catalysts, which comprise sulphides of heavy metals, other than iron which are likewise precluded during and after their preparation from substances having a substantial oxidizing action but which have been prepared by decomposition of thio salts of heavy metals at elevated temperatures, the heavy metals present in the sulphides thus being completely combined with sulphur. This invention also forms part of the original application Ser. No. 586,948.

The present application is concerned with a modification of the said invention claimed in application Ser. No. 728,132 according to which the sulphide catalysts suitable for carrying out the said catalytic reactions are prepared by thermal decomposition of partially thionated salts, i. e., salts of oxygen acids of metallic elements the oxygen of which has only partially, usually to the extent of from 20 to 95 per cent, been replaced by sulphur, and substantially excluding substances having an oxidizing effect during or after the preparation. As partially thionated salts come into consideration for example metals of the 5th and 6th groups of the periodic system such as tungsten, molybdenum, chromium or vanadium or the like, or of other heavy metals, such as copper, rhenium and the like. The said thermal decomposition is preferably effected in the presence of liquid or vaporous sulphur or volatile sulphur compounds containing the sulphur in divalent state, in particular of hydrogen sulphide and in any case in the absence of oxygen or gases containing the same, such as air or steam. Suitable volatile divalent sulphur compounds are also carbon disulphide, thiophenol, mercaptan and thio acetic acid. The said sulphur or volatile sulphur compounds may be employed together with hydrogen or with other extraneous gases, such as nitrogen, carbon monoxide or carbon dioxide.

As sulphidizing agents may also be employed gas mixtures which under the conditions of operation yield sulphur or divalent sulphur compounds, as for example mixtures of sulphur dioxide and hydrogen.

The treatment of the said partially thionated salts is preferably carried out by compressing volatile sulphur compounds, such as hydrogen sulphide, carbon disulphide and the like, either alone or in admixture with each other or with gases other than those comprising free oxygen or splitting off oxygen under the conditions of operation such as steam, at room temperature or elevated temperature and allowing them to flow over or through the said thionated salts at an elevated temperature at which decomposition takes place. Sulphur, especially in the vaporized form, may be used instead of volatile sulphur compounds. The sulphur which remains unused after the treatment may be removed by leading thereover hydrogen or other gases. Sometimes it is also preferable to carry out after this operation a treatment with volatile compounds of divalent sulphur, especially hydrogen sulphide. Sometimes it is advantageous to expose the partially thionated salts to the vapors or gases containing elementary or combined sulphur in as finely ground a state as possible. But the material to be treated may also be present in other forms, as for example in the form of plates, sticks, nets, cubes, rings or star-shaped bodies as may appear most suitable for the catalytic reaction. Sometimes it may be advantageous to employ the catalyst materials in the form of frothy structures which may be obtained by adding substances evolving gases during the preparation of the catalyst such as ammonium carbonate or ammonium nitrite. The material to be treated may be kept in motion, as for example by stirrers, spirals, paddles or shaking grates.

It has been found to be preferable to vary the temperature and/or the pressure during the treatment, which may be effected by increasing or decreasing the temperature and/or the pressure; for example the temperature may be slowly raised from 300° to 400° C. while the pressure is maintained at 10 atmospheres or slowly raised from 2 to 15 or 50 atmospheres. When working with hydrogen sulphide pressures between 2 and 15 atmospheres are suitable. But also pressures up to 100, 150, 200 and 1000 atmospheres may be employed when high pressure vessels are available for the treatment of the catalyst. But also ordinary pressures may be employed. If the treatment with sulphur or volatile sulphur compounds is carried out under pressures higher than from 5 to 10 atmospheres it requires a shorter reaction period than when a pressure of only 2 atmospheres is employed. The catalyst may also be treated with sulphur or volatile sulphur compounds first at rising temperatures without the employment of pressure and then further treated under increased or increasing pressure at the same or a raised temperature or rising temperatures. For example, the catalyst may be treated with hydrogen sulphide first by heating in the course of from 30 to 70 hours from 150° to 300° or up to 400° C. under atmospheric pressure and then heating at 400° or 500° C. under a pressure of 10 or 15 atmospheres or at pressures rising in the course of 10 to 30 hours from 2 up to 20 atmospheres; or the catalyst may be heated in the presence of hydrogen sulphide under athospheric pressure up to 300° C. and then further up to 415° C. under pressures of between 5 and 10 atmospheres or rising from 1 to 10 or from 1 to 15 or more atmospheres. It may also be advantageous to pretreat the partially thionated salts with hydrogen at elevated temperatures as for example at 250° or 300° C. or 400° C. at atmospheric or elevated pressures as for example of 10, 50, 100 or 200 atmospheres.

The treatment of the partially thionated salts may be effected in the same reaction chamber in which the catalytic reaction itself is carried out later on. It is not necessary to bring the material to be treated into the shape desired for the catalytic reaction before the sulphurization, because the shape may be subsequently imparted to the metal sulphide produced, for example by a pressing treatment or any other mechanical means. The catalyst materials may be employed in a rigid arrangement as plates, rings, sieves, cylinders or as coarse or fine grained materials between wire netting, or they may be introduced into the reaction vessel in the form of lumps or small cubes which may lie irregularly or in a regular arrangement on sieves or similar supporting devices.

The catalysts so produced may have added to them other substances which may act catalytically themselves, or as carriers or simultaneously as catalysts and carriers and which do not split off free oxygen under the working conditions, in particular together with sulphides obtained in a manner different from that described above, for example those obtained by interaction, at elevated temperatures, but under ordinary pressure, of metals or metal oxides and sulphur or divalent sulphur compounds. Also other substances, if desired, before the sulphidizing treatment may be added, for example difficultly reducible metal oxides, such as zinc oxide, titanium oxide, and alumina, or chromium oxide, magnesia, magnesite, furthermore active carbon, active silica, active alumina, bentonite, Florida earth, pumice. If carriers are employed the catalytic material may be applied to them either before or after the sulphurizing treatment. The sulphides obtained according to the present invention may also be mixed with metals, preferably in a finely divided state, such as aluminium, magnesium, silicon, tungsten, molybdenum, and then mechanically pressed together, if desired. A catalyst prepared from about 80 parts of metal sulphide, as for example tungsten sulphide obtained by decomposition of a partially thionated tungsten salt in the presence of hydrogen sulphide and about 20 per cent of metal powder, such as aluminium powder has proved to be of particular advantage.

The partially thionated salts may be obtained for example by leading hydrogen sulphide through, or adding suitable soluble sulphides or solutions thereof, and more particularly ammonium sulphide solution to, aqueous solutions of salts, as for example ammonium tungstate to such an insufficient extent that only partially thionated salts are formed. These salts, as for example ammonium thio oxy sulpho tungstate, are then converted into the corresponding sulphides at an elevated temperature usually ranging between about 200° and 500° C., as for example at about 300° C. in a current of a non-oxidizing gas preferably containing hydrogen sulphide, but also hydrogen, nitrogen ammonia or carbon dioxide or other extraneous gases may be present instead of or in addition to hydrogen sulphide. If no volatile sulphidizing agent is added usually oxy sulphides are obtained by the decomposition and these may then be converted into sulphide or polysulphide free from oxygen by subsequent treatment with sulphur or volatile sulphur compounds free from oxygen such as hydrogen sulphide, carbon disulphide or the like at elevated temperatures ranging between about 300° and 500° C., as for example 400° C. These methods may be carried out, as aforesaid, in a single operation by adding sulphur vapor or volatile sulphur compounds free from oxygen to the said gases before the decomposition of the thio salts. For the preparation of the partially thionated salt the concentration of the hydrogen sulphide or of the soluble sulphide employed must increase correspondingly with an increase in the concentration of the salt in solution, which is to be converted into the thio compound.

The catalysts prepared in the said manner may be employed in admixture with each other or with other catalysts, especially with sulphides obtained by other methods, which are prepared for example from the metals and sulphur or sulphur compounds or from metal oxides or solutions of metal salts by treatment with hydrogen sulphide at elevated temperatures, if desired under pressure. Oxides not reducible to the metal with hydrogen at temperatures below 400° C. as for example zinc oxide, titanium oxide, magnesia, alumina and the like, may also be added as these often act as promoters or as carriers. As further examples of carriers may be mentioned active carbon, active silica, bentonite, Florida earth, bauxite, pumice stone, magnesite, chromium oxide and the like. It may be advantageous to apply the partially thionated salts or the metal sulphides to the carriers or promoters and then to carry out the decomposition into sulphides or the treatment with volatile sulphur compounds, the said treatment being preferably effected in the reaction chamber itself.

The catalysts according to the present invention are eminently active in the production of valuable hydrocarbons by the destructive hydrogenation of coals, tars, mineral oils, their distillation, extraction and conversion products and residues with hydrogen or gases having a reducing action which contain combined hydrogen, especially in a flowing condition, at elevated temperatures, in particular those ranging between 300° and 700° C. and under pressure, preferably above 50 atmospheres, or also in the cracking of liquid carbonaceous materials. The result may be the splitting up of the initial materials with the addition of hydrogen or the conversion of aliphatic hydrocarbons into aromatic or the simple refining of the initial materials, as for example crude benzene. Other catalytic reactions, such as the purification of gases by treatment with hydrogen, the preparation of methanol or hydrocarbons from carbon monoxide and hydrogen, the purification, especially the desulphurization, of carbonaceous substances (tar oils, mineral oils, fractions thereof such as crude benzol and the like) with hydrogen, preferably under pressure, the preparation of hydrogen sulphide from its elements, the hydrogenation of unsaturated and aromatic hydrocarbons, the dehydrogenation of hydrocarbons, the preparation of hydrogen or polymerization products from the waste gases from destructive hydrogenation or cracking gases and the like, may also be carried out with the said catalysts.

The catalysts obtainable according to the present invention are of particular advantage for the treatment of materials containing sulphur and which are free from oxygen. With materials containing oxygen, such as those containing phenols, it is of advantage to continuously add to the hydrogenating gas sulphur or divalent sulphur compounds, as for example hydrogen sulphide or carbon disulphide. It is also of advantage to mix sulphur to the initial materials.

According to the present invention the reaction chambers, for example, in the destructive hydrogenation of coals, tars, mineral oils and the like, may be subjected to high throughputs of the materials to be treated per unit of time without the yields of valuable products being injuriously affected. Thus the yield of useful hydrocarbon products obtained with the catalysts in accordance with the present invention is often 5 to 10 times as high as when working under otherwise like conditions and with the same high throughput with a catalyst prepared from molybdic acid and magnesium oxide. The catalysts have the further advantage that, for example, the destructive hydrogenation may be carried out at lower temperatures, as for example from 50° to 70° C. or more lower, than when employing sulphides from the usual sources, and with the same throughputs whereby the formation of gaseous hydrocarbons is prevented to a large extent. The resulting middle oils and products of higher boiling point are rich in hydrogen and may be advantageously worked up into illuminating oils, Diesel oils or lubricating oils; they may also be subjected to a cracking process or returned to the reaction chamber and may readily be split into valuable products of lower boiling point by reason of their high content of hydrogen.

The resulting benzines may be improved, when necessary, as regards their knocking properties by converting a fraction thereof into aromatic substances, for example by destructive hydrogenation above 500° C. and adding it to the main fraction again. The said catalysts, by reason of their good hydrogenating action, may be employed with special advantage for converting initial materials poor in hydrogen which are unsuitable for the preparation of benzine by destructive hydrogenation or cracking into products rich in hydrogen, even at comparatively low temperatures, as for example from 300° to 350° C., if desired without appreciable splitting.

In the same way, hydrocarbons containing oxygen or sulphur may be freed by means of the said catalysts in the presence of hydrogen from oxygen and sulphur (which treatment is also called hydrofining) and, if desired, subjected to a cracking, if desired in the presence of hydrogen.

The preparation of illuminating oils and lubricating oils by destructive hydrogenation may also be carried out with the said catalysts with substantially greater throughputs than with the catalysts hitherto known.

The sulphides prepared according to the present invention are entirely free from oxygen. No oxygen can be found therein by analytical methods. It is believed that these catalysts are even free from small traces of oxygen which cannot be detected by the minutest methods of analysis. This assumption is supported by the fact that if these catalysts are exposed to the air at ordinary temperature their activity begins to slowly decrease after a course of several days and that if stored in the presence of air for several weeks their activity becomes equal to that of the catalysts obtainable according to the hitherto usual methods, for example by converting metal oxides, such as tungsten oxide, with hydrogen sulphide at ordinary pressure. In the thus stored catalysts oxygen cannot be detected by analytical methods, but it may be that very small traces of oxygen from the air have been combined with or occluded to the catalytic mass. However, we wish to be understood that we do not restrict ourselves to this theory.

We have found that the above mentioned decrease in the catalytic activity of the catalysts obtained according to the present invention does not occur if these catalysts are precluded also after the preparation from free oxygen or substances having a substantial oxidizing effect. By "substances having a substantial oxidizing effect" we understand also air under atmospheric temperature if it is allowed to be in contact with the catalysts for a long time, as for example several days or more.

With iron sulphide prepared according to the methods above specified no marked improvement has been found compared with the sulphide obtained according to the hitherto known methods. Therefore the use of iron sulphide is not claimed in the present application.

The following examples will further illustrate the nature of this invention but the invention is not restricted to these examples.

Example 1

Ammonium oxy sulpho tungstate is completely converted into tungsten disulphide by leading hydrogen sulphide thereover at about 400° C. This is shaped into pieces and arranged rigidly in a high-pressure chamber. If a middle oil obtained by the destructive hydrogenation of mineral coal low temperature tar be led together with hydrogen under a pressure of 250 atmospheres over the said catalyst at 430° C., a product is obtained consisting up to the extent of 50 per cent of constituents boiling up to 180° C. The remainder may be employed as a Diesel oil.

Example 2

Ammonium oxy sulpho molybdate is completely converted into molybdenum disulphide by leading hydrogen sulphide thereover at about 390° C. This is shaped into pieces and arranged rigidly in a high-pressure chamber. If a middle oil fraction of a mineral oil be led together with hydrogen under a pressure of 200 atmospheres over the said catalyst at 415° C. a product is obtained consisting up to the extent of 60 per cent of constituents boiling up to 180° C.

What we claim is:

1. In carrying out non-oxidizing catalytic reactions at elevated temperatures with combustible carbonaceous materials the step which comprises employing as a catalyst a sulphide of a heavy metal other than iron capable of forming a thio salt, which sulphide during and after its preparation is precluded from substances having a substantial oxidizing action and has been prepared by thermal decomposition of a partially thionated salt, containing said heavy metal in the acid radicle, at an elevated temperature between 150 and 500° C. in combination with a treatment with a sulphidizing agent for a time sufficient for ensuring the formation of a sulphide free from oxygen from the said partially thionated salt, the heavy metal present in the sulphide thus being completely combined with sulphur.

2. A process for the destructive hydrogenation of hydrocarbon products at a temperature between 200° and 700° C. and under superatmospheric pressure which comprises working in the presence as catalyst of a sulphide of a heavy metal other than iron capable of forming a thio salt, which sulphide during and after its preparation is precluded from substances having a substantial oxidizing action and has been prepared by thermal decomposition of a partially thionated salt containing said heavy metal in the acid radicle at an elevated temperature between 150 and 500° C. in combination with a treatment with a sulphidizing agent for a time sufficient for ensuring the formation of a sulphide free from oxygen from the said partially thionated salt, the heavy metal present in the sulphide thus being completely combined with sulphur.

3. In the process as claimed in claim 2 working in the presence of a sulphide resulting from the decomposition of a partially thionated salt containing in the acid radicle a metal selected from groups 5 and 6 of the periodic system.

4. The process as defined in claim 1, wherein the heavy metal is molybdenum.

5. The process as defined in claim 1, wherein the heavy metal is tungsten.

6. The process as defined in claim 2, wherein the heavy metal is molybdenum.

7. The process as defined in claim 2, wherein the heavy metal is tungsten.

8. The process as defined in claim 1, wherein the thermal decomposition takes place in the presence of hydrogen sulphide as the sulphidizing agent and wherein the thermal decomposition comprises an initial heat treatment at a temperature of from about 150° to about 400° C. at atmospheric pressure and a subsequent heat treatment at a temperature of from about 400° to about 500° C. under a pressure up to 20 atmospheres.

9. The process as defined in claim 1, wherein the thermal decomposition takes place in the presence of hydrogen sulphide as the sulphidizing agent and wherein the thermal decomposition comprises an initial heat treatment at temperatures up to 300° C. at atmospheric pressure and a subsequent heat treatment at temperatures up to 415° C. at a superatmospheric pressure ranging up to 15 atmospheres.

MATHIAS PIER.
PAUL JACOB.
WALTER SIMON.